May 22, 1945.  A. R. THOMPSON  2,376,526
CONTINUOUS PEACH PITTER
Filed Jan. 26, 1942   6 Sheets-Sheet 1

Inventor
Albert R. Thompson
By Lyon & Lyon
Attorneys

Inventor
Albert R. Thompson
By Lyon & Lyon
Attorneys

May 22, 1945. A. R. THOMPSON 2,376,526
CONTINUOUS PEACH PITTER
Filed Jan. 26, 1942 6 Sheets-Sheet 3
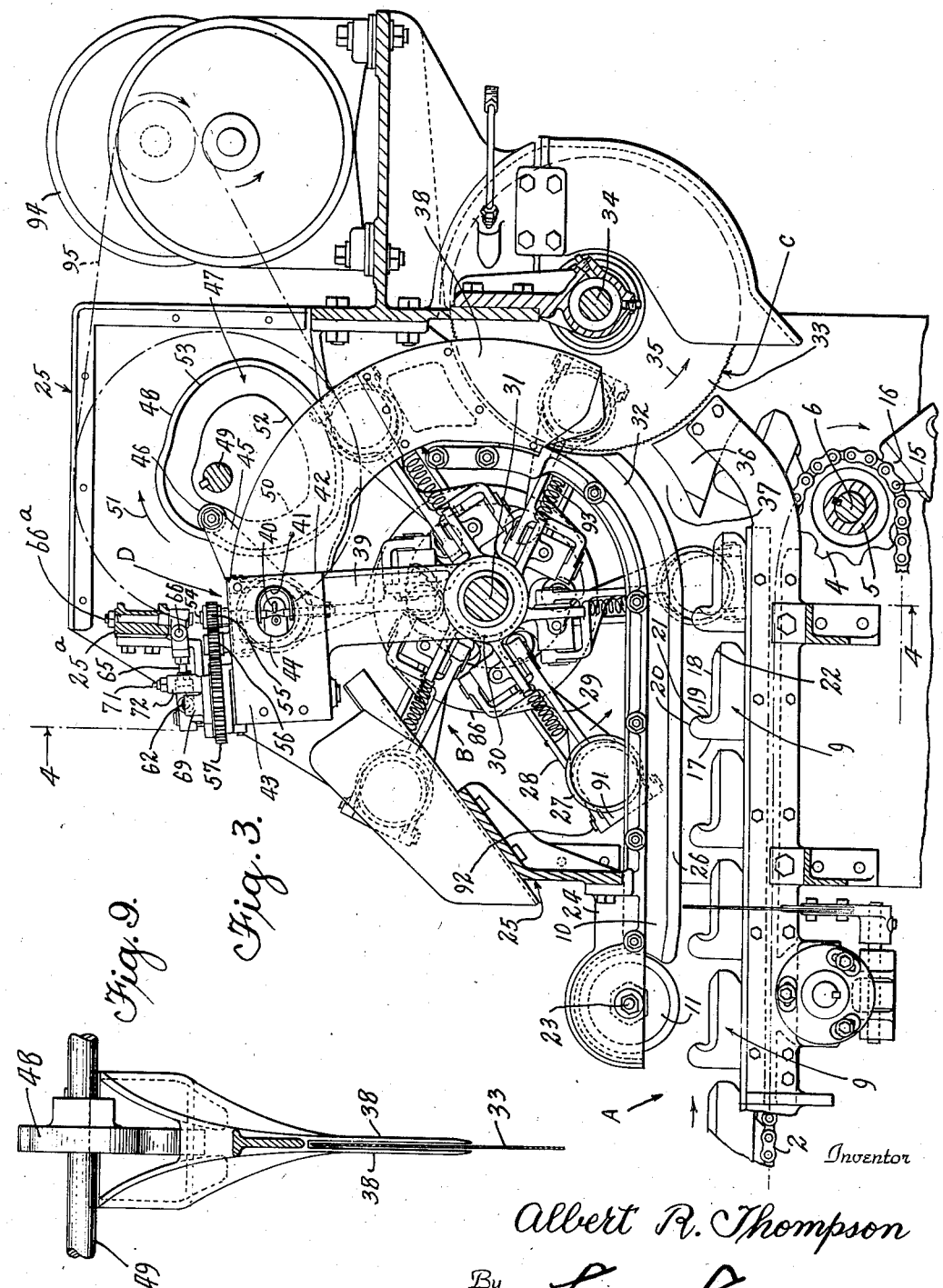
Inventor
Albert R. Thompson
By Lyon & Lyon
Attorneys May 22, 1945.　　A. R. THOMPSON　　2,376,526
CONTINUOUS PEACH PITTER
Filed Jan. 26, 1942　　6 Sheets-Sheet 4

Inventor
Albert R. Thompson
By Lyon & Lyon
Attorneys

Inventor
Albert R. Thompson
By Lyon & Lyon
Attorneys

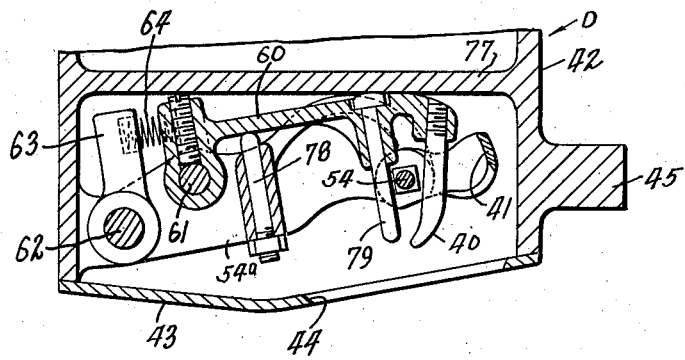
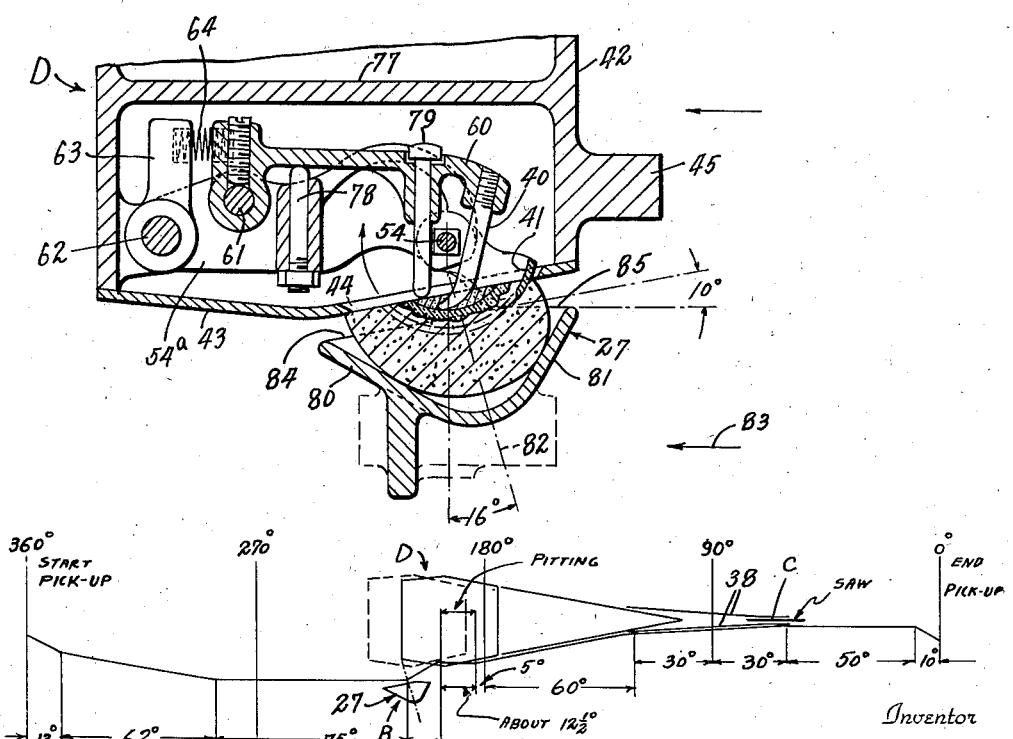

Patented May 22, 1945

2,376,526

UNITED STATES PATENT OFFICE 2,376,526

CONTINUOUS PEACH PITTER

Albert R. Thompson, San Jose, Calif., assignor to Pacific Machinery Company, San Francisco, Calif., a corporation of California Application January 26, 1942, Serial No. 428,199

17 Claims. (Cl. 146—28)

This invention relates to peach pitters, and more particularly to a peach pitter of the continuously operating type as distinguished from the intermittently operating pitting machines heretofore employed in this art.

In the production of peach pitting machines, particularly those applicable for removing pits from clingstone peaches, efforts have been made over an extended period of time to develop a satisfactorily operating machine of the continuously operating type wherein the peaches as fed into the machine are positioned in the feed mechanism and the machine then carries through the operations of trimming, pitting and halving the fruit to produce peach halves suitable for canning or other processing operations.

In the production of such machines, many problems have presented themselves due to the varying sizes of fruit to be handled, the various sizes of pits carried by the fruit, and the problem of producing a feed which would be rapid enough to permit the economic operation of such a machine.

It is therefore an object of this invention to produce a continuously operating fruit pitting machine particularly applicable for the pitting of clingstone peaches.

Another object of this invention is to provide a fruit pitting machine of the continuously operating type including a feed mechanism, a splitting mechanism, and a pit-removing mechanism, all of which are correlated in such a manner as to permit continuous and efficient operation.

Another object of this invention is to produce a fruit pitting machine particularly applicable for the pitting of clingstone peaches in which means are provided for removing the pit from the fruit, which means includes a pit finder adapted to operate in conjunction with a pitting knife.

Another object of this invention is to provide a fruit pitting machine in which means are provided for the removing of the pits from the previously halved fruit, including a means for positioning and presenting a pit finder against the pit to locate the relation of a pitting means with relation to the fruit pit.

Another object of this invention is to provide a fruit pitting machine including a fruit transfer means having fruit engaging members adapted to engage fruit of varying sizes in such manner as to present the stem and the fruit in position of registry with a pit removing knife.

Another object of this invention is to produce a fruit pitting machine in which means are provided for positioning and presenting previously halved peaches with relation to a pitting knife in such manner as to cause the fruit pitting knife to begin its cut at the edge of the pit nearest the stem end of the fruit and wherein the size of the fruit pit determines the position of the fruit half with relation to the pitting knife as to cause the pitting knife to pass closely around the pit during severing of the fruit flesh to remove the pit from the fruit.

Another object of this invention is to provide a fruit pitting machine in which means are provided for feeding fruit to the fruit holding means during which feeding the flesh of the fruit is cut in the plane of suture of the fruit pit and wherein means are provided for carrying out the fruit flesh severing operations without danger of rotation of the fruit upon the feeding elements.

Other objects and advantages of this invention it is believed will be apparent from the following detailed description of a preferred embodiment thereof as illustrated in the accompanying drawings.

In the drawings:

Figure 3 is a longitudinal aprroximately midsection elevation of the fruit pitting machine embodying my invention illustrating the supporting frame and conveying means broken away.

Figure 7 is a fragmental sectional view taken substantially on the line 7—7 of Figure 6.

Figure 8 is a view similar to Figure 7 illustrating the pitting means and pit finding element in position with relation to a fruit half and during the operation of removing the fruit pit from a fruit half.

Figure 9 is a fragmental elevation illustrating the relationship of the dividing plates to the fruit halving means.

Figure 11 is a diagrammatic illustration of the cycles of operation of the machine embodying my invention.

Figure 1:
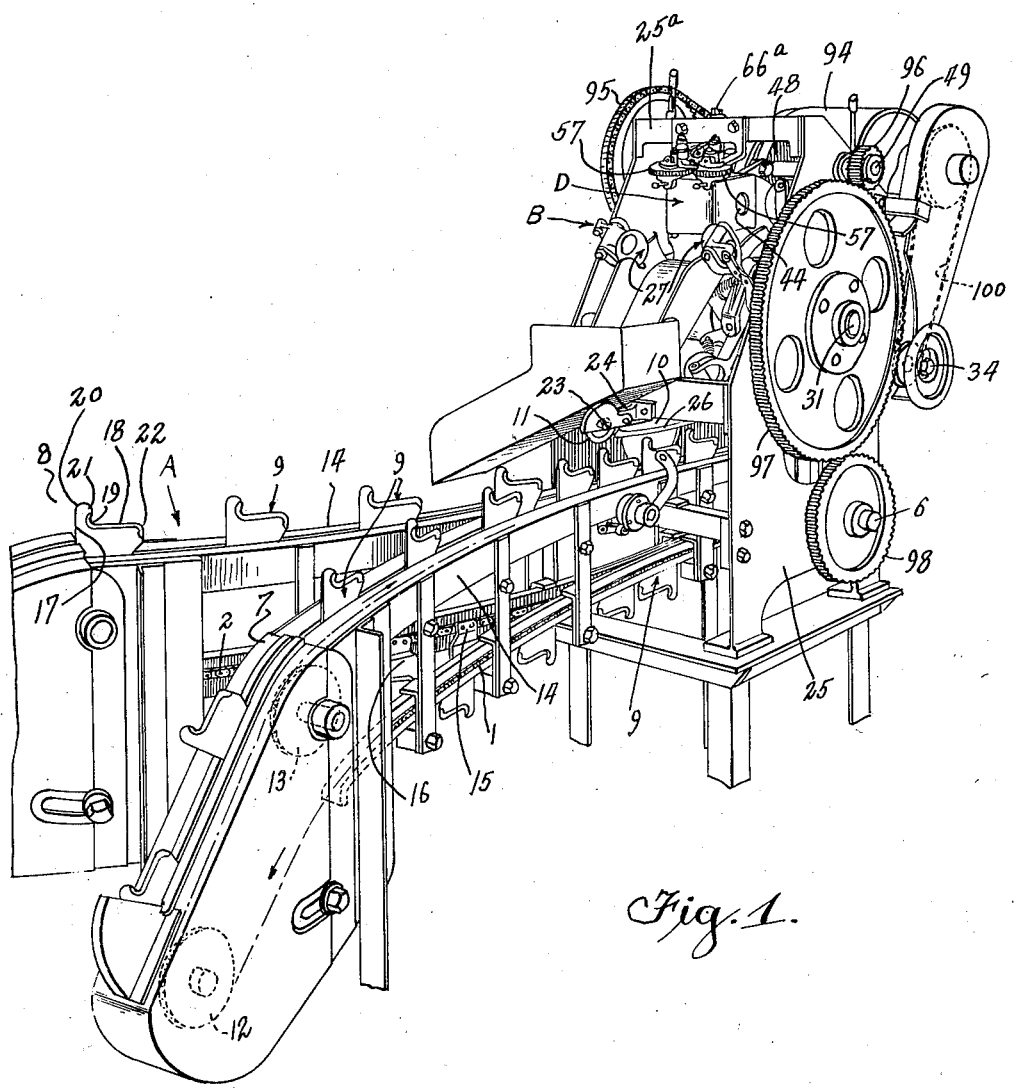
Figure 1 is a perspective view of the continuously operating fruit pitting machine embodying my invention.
Figure 2:
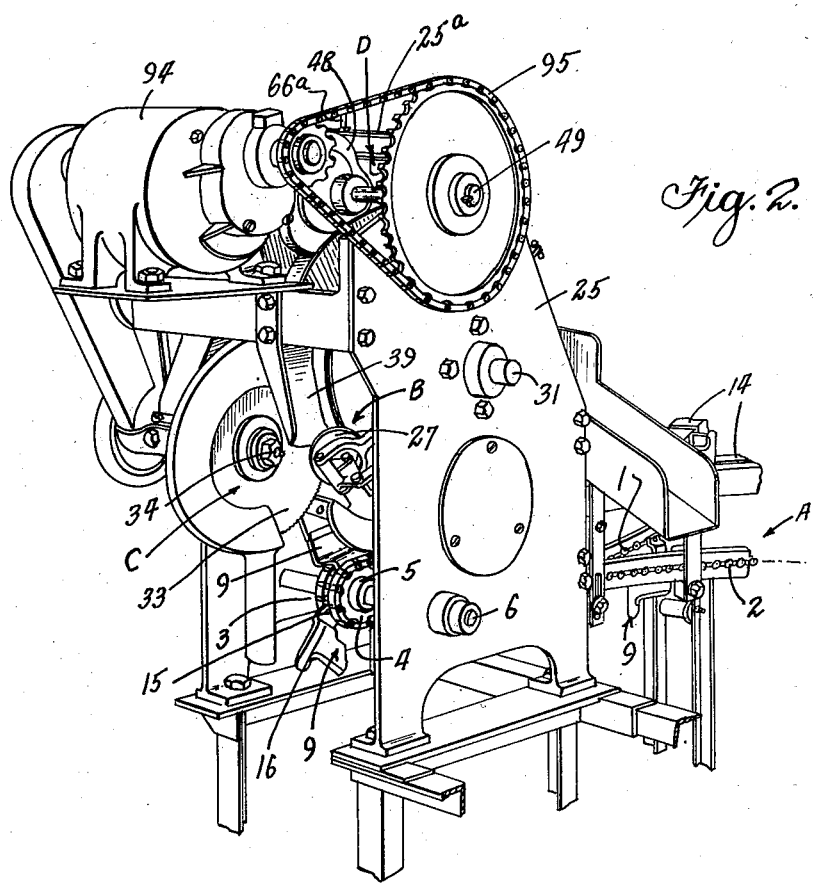
Figure 2 is a rear perspective view of the machine as illustrated in Figure 1 with the feed conveyers broken away.
Figure 10:
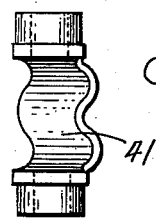
Figure 10 is an enlarged elevational view of the fruit pitting knife.

In the preferred embodiment of my invention as illustrated in the accompanying drawings, the continuously operated fruit pitting machine is illustrated as including a fruit feeding conveying means A, a fruit transfer means B, through the medium of which the fruit with its flesh cut in the plane of suture is transferred to a fruit halving means C, and which transfer means B acts to convey the halved fruit from the halving means C to the pitting means D where the halved sections of the pit are removed from the fruit halves as the fruit is conveyed by the transfer means B to the fruit discharge where the pitted fruit halves are discharged from the machine.

As illustrated, the fruit conveying means A includes a divided conveyer element composed of a pair of conveyer chains 1 and 2 trained over drive sprockets 3 and 4 mounted upon a common hub 5 secured to the conveyer drive shaft 6. As the conveyer chains 1 and 2 leave the pitting machine, they diverge from each other to spaced apart feeding positions 7 and 8.

Each of the conveyer chains 1 and 2 is provided with spaced fruit receiveing impaling blades 9 which are so positioned upon the respective conveyers 1 and 2 that the impaling blades 9 of the conveyer chain 1 pass between the feed impaling blades 9 prior to the blade 9 reaching the position of the stationary impaling blade 10 and primary skin-severing disc 11 where the flesh of the fruit not cut by the impaling blade 9 is cut prior to the feeding of the fruit to the halving means C.

The chains 1 and 2 are trained over idler sprockets 12 and 13 so that they extend in an upwardly inclined direction as the impaling blades 9 enter the feeding positions of the feed sections 7 and 8.

Figure 4:
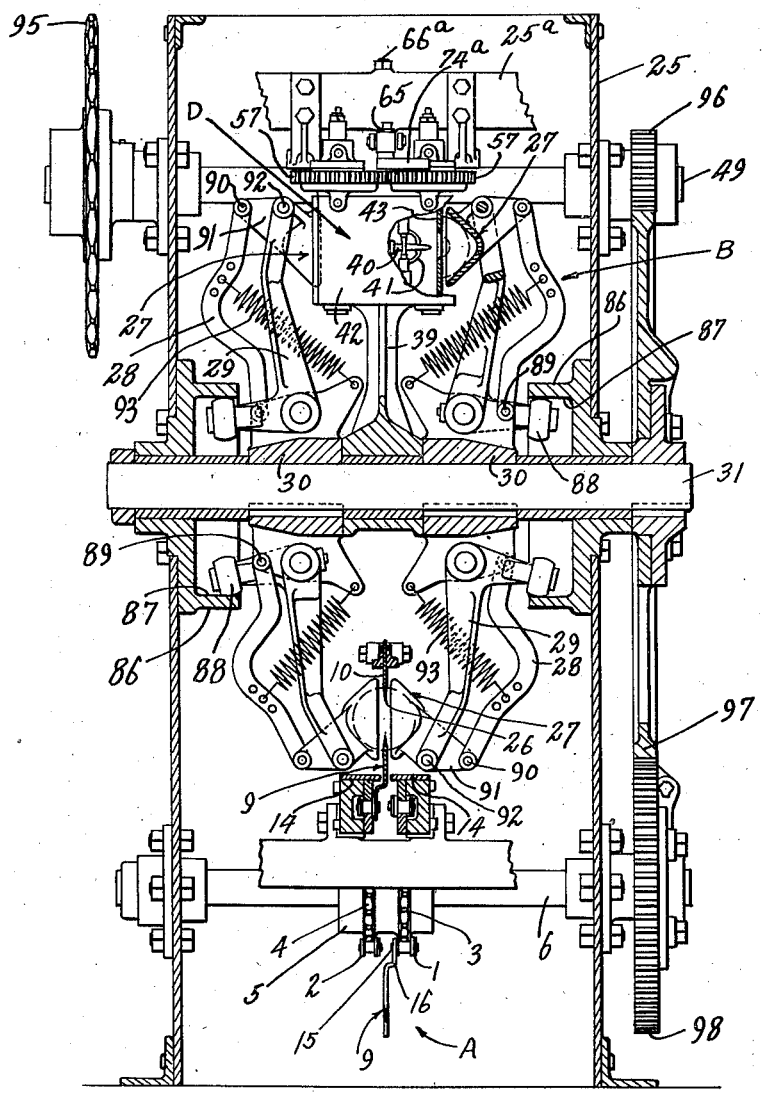
Figure 4 is a sectional elevation taken substantialy on the line 4—4 of Figure 3.

Suitable conveyer guards 14 are provided for housing the conveyer chains 1 and 2 and sprockets 12 and 13 to avoid any possibility of the operator contacting the moving chains or sprockets. The impaling blades 9 are suitably affixed to the conveyer chains 1 and 2 in any suitable manner as indicated at 15 (Figure 4), and each blade is carried by an offset support indicated at 16 so that the impaling blades 9 are aligned in a vertical plane prior to their reaching the position of the skin-severing disc 11. The advantage of this particular feed lies in the fact that it permits two operators to feed a single machine, therefore enables the operators to feed the machine at a capacity at which the machine may efficiently operate to pit the fruit halves, and therefore only one machine is required to handle the feeding of two operators.

The impaling blades 9 are formed with vertical impaling sections 17 having horizontally extending knife blade sections 18 and a pit-receiving notch 19 formed at the rear of the knife sections 18 terminating in a stem and locating head 20 for guiding the operator in proper location of fruit during the feeding operation. An operator thus standing at the feeding sections 7 or 8 will grasp the fruit, for example a clingstone peach, in both hands, positioning the plane of suture of the pit in a vertical plane, and will hold the fruit in the position where the impaling blade as it travels up the inclined section defined by the sprockets 12 and 13 will pass under the lower edge of the fruit so that the knife section 18 will sever the flesh of the fruit at the lower section of the fruit as the locating head 20 is located in the stem recess as the operator presses downwardly upon the fruit to locate the pit in the pit recess 19.

By forming the rear section of the impaling blade 9 with a substantially vertically extending cutting edge as indicated at 21, the entire lower half of the fruit may be cut in the plane of suture during the feeding operation, particularly where the advanced edges of the impaling blades 9 are formed with the advanced edges 22 with a vertical knife section.

The fruit is conveyed by the impaling blades 9 to the position where they pass under the skin-severing disc 11 which operates to cut the flesh of the fruit in the plane of suture prior to the fruit passing under the stationary impaling blade 10. The disc 11 is mounted to rotate upon a supporting pin 23 and is carried by a bracket 24 from the frame 25. The use of this rotating skin-severing disc overcomes any tendency of the fruit positioned upon the impaling blades 9 to rotate as the fruit is moved under the stationary impaling blade 10. The stationary impaling blade 10 is sharpened as indicated at 26 and cuts the flesh of the fruit substantially to the depth of the pit as the fruit is conveyed thereunder on the impaling blades 9.

As the fruit is conveyed upon the impaling blades 9 under the stationary pitting blade 10, it is picked up in the holding cups 27 (Figure 4) of the transfer means B. The holding cups 27 are supported upon the holding cup arms 28 and the holding cup operating arms 29 carried by the transfer means operating heads 30 which are secured to transfer means shaft 31 journaled in bearings within the frame 25. The shaft 31 is driven as will hereinafter be described.

The fruit is gripped between the cups 27 and is removed by the cups 27 from the impaling blades 9 and caused to travel along the curved blade section 32 of the stationary impaling blade 10 and is presented to the saw blade 33 of the fruit halving means C. The saw blade 33 is secured to a driven shaft 34 and is driven in a direction indicated by the arrow 35.

As the fruit is removed from the impaling blade 9, it is passed onto a holding blade 36 with the pit located in the path 37 maintained between the holding blade 36 and the curved section of the impaling blade 10. As the cups 27 continue to move, they cause the fruit to pass over the rotating saw 23 with the result that the fruit flesh and the fruit pit are cut into halves.

Immediately following the severing of the fruit flesh and pit into halves, the two halves of the fruit held by the cups 27 pass onto the surfaces of the guide blades 38 which lie closely against the sides of the saw blade 33 and diverge away from the blade to separate the fruit halves (Figure 9). The fruit halves are thus supported between the holding cups 27 and the surfaces of the guide blades 38 and are moved over these surfaces by the cups 27 to the pitting means D.

As will hereinafter be described, the fruit cups 27 are carried from their supporting heads 30 in such manner as to permit of the foregoing described operation and also so as to position the fruit of varying sizes so that the stem end of the fruit pit will be moved into a position of registry with relation to the pitting knife so that the pitting knife can pass into the flesh of the fruit adjacent the stem end of the fruit pit at the start of the pit removing operation.

The fruit pitting unit D is carried on an arm 39 which is journaled on the transfer shaft 31 and is adapted to move with the fruit cups 27 and hence the fruit halves carried thereby during the pitting operation thereby avoiding the necessity of intermittently operating the transfer means B and permitting continuous operation of the machine embodying my invention.

The fruit pitting unit C includes a pair of pitfinding elements 40 and a pair of pitting knives 41 operable for locating the pit halves in the fruit halves and for removing the pit halves therefrom.

The fruit pitting unit D is carried by a fruit pitting unit frame 42 secured to the end of the arm 39 and includes the spaced-apart fruit contact plates 43 having pitting apertures 44 formed therein. The plates 43 are formed to provide a continuation of the guide plates 38 and abut the ends of the guide plates 38 at the time that the fruit halves pass from the plates 38 onto the plates 43. The frame 42 is provided with an actuating arm 45 which carries a cam roller 46. The cam roller 46 is positioned within a camway 47 of a cam wheel 48 secured to the cam shaft 49. The cam shaft 49 is driven in timed relationship with the drive of the transfer shaft 31. The cam track 47 is formed with the pitting unit advancing section 50 so that as the cam is rotated in the direction of the arrow 51, the pitting unit D is advanced to correspond with the advancing movement of the cups 27. The camway 47 is provided with a flat section 52 during which further advance of the unit D is substantially arrested and the final cam section 53 of the camway 47 provides the return section for returning the unit D to its starting position between pitting operations as determined by the spacing apart of the cups 27 of the transfer unit B.

Means are provided for operating the pit finders 40 and the pitting knives 41, which means are preferably of the following construction.

The fruit pitting knives 41 are carried upon pitter shafts 54 which are journaled on bearings carried by yoke arms 54a. Secured to the shafts 54 are driving pinions 55 which mesh with idler pinions 56, which idler pinions 56 in turn mesh with pitter drive gears 57. The gears 57 are in turn secured to yoke arm shafts 62 through the medium of safety release clutches 58, the construction and operation of which will be hereinafter specifically set forth. The pit finders 40 are carried upon pit finder arms 60 which are secured to pit finder shafts 61 journaled within the yoke arms 54a. The yoke arms 54a are journaled upon a yoke arm shaft 62 secured within the pitter frame 42. Stop arms 63 are secured to the yoke shaft 62 and springs 64 are positioned between the stop arms 63 and the finder arms 60 normally urging the finder arms 60 in a direction to thrust the pit finders 40 into position in advance of the pitting knife 41.

Figure 5:
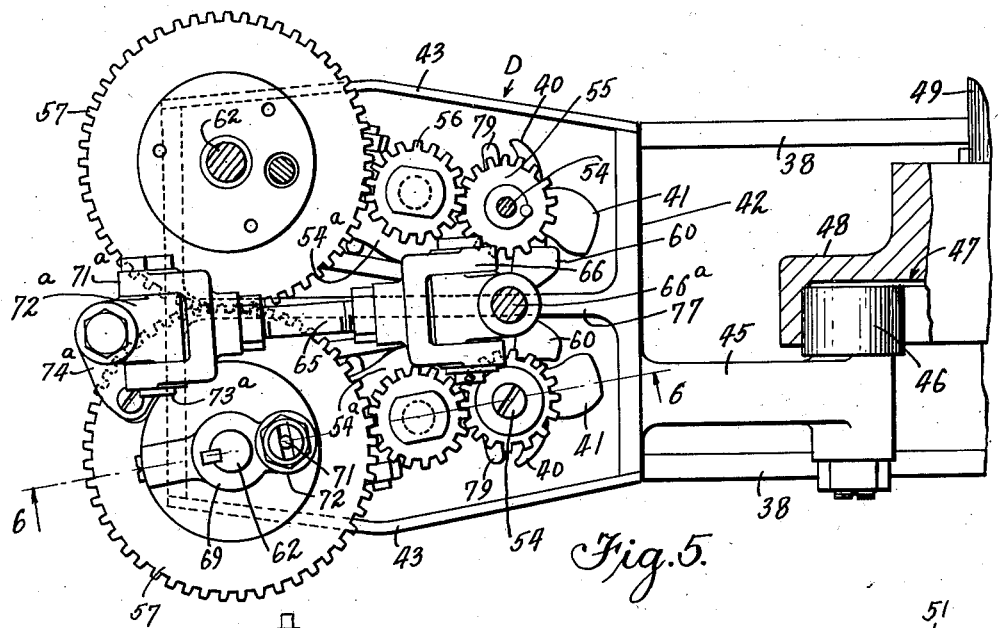
Figure 5 is a detached plan view of the pitting head mechanism illustrating the same as positioned with relation to its operating mechanism.
Figure 6:
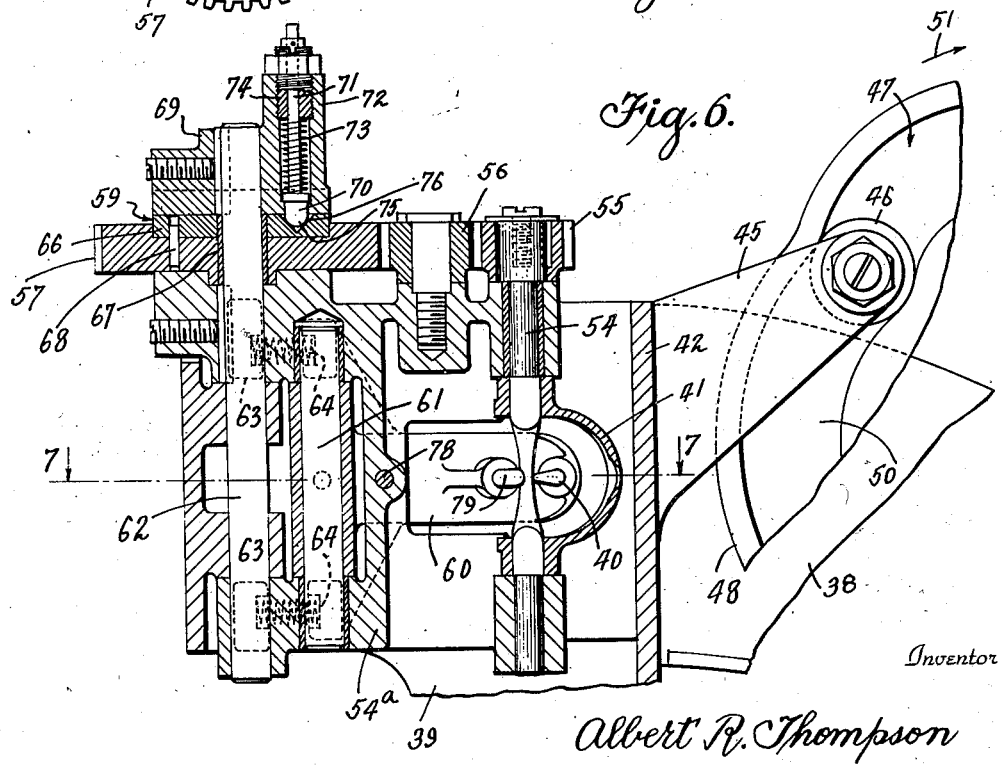
Figure 6 is a sectional view taken substantially on the line 6—6 of Figure 5.

The means for driving the pitting units D include a pitman 65 which is secured through the medium of a yoke clevis 66 to a pin 66a (Figures 4 and 5) to the transverse frame bar 25a of the frame 25. The pitman at its opposite end is secured by means of a clevis yoke 71a to a clevis arm 72a pivotally journaled on a pin 73a carried in the clevis yoke 71a. The clevis arm 72a is pivotally secured to a crank arm 74a secured to one of the drive gears 57. The gears 57 are positioned in mesh (Figure 5). It will thus be apparent that when the pitting unit C is caused to progress with the transfer unit B under the influence of the cam means 46, 53, that the drive gears 57 are rotated due to their movement and connection with the stationary pitman 65. The drive gears 57 are connected with the yoke shaft 62 by means of the yielding drive provided by the safety clutches 58. These clutches include clutch discs 66 which are journaled on bushings 67 mounted upon the shaft 62. The clutch plates 66 are secured to the gears 57 by means of drive pins 68.

Secured to the ends of the shaft 62 are clutch collars 69. The clutch collars 69 are provided with clutch dogs 70 carried upon the ends of the pins 71 mounted in cylindrical extensions 72 of the clutch collars 69. Springs 73 are mounted between the clutch dogs 70 and the plugs 74 to yieldably urge the engaging of the semi-cylindrical engaging heads 75 of the clutch dogs 70 into depressions 76 formed in the clutch plates 59. By this means a yieldable drive is formed between the driving gears 57 and the yoke shaft 62 for the purpose as will hereinafter be set forth.

The pit finder arm 60 and the yoke arm 54a are adapted to move within the pitting frame 42 between the limits established by the frame cross plate 77 and the contact plates 43. In the normal position as indicated in Figure 7, the yoke arms 54a contact the under surface of the frame cross plate 77.

Carried by the yoke arm 54a are adjustment pins 78 which contact the under surface of the pit finder arms 60 to determine adjustably the initial relationship of the pit finders 40 to the pitting knives 41 that serve as a limit stop for the relative movement between the pit finder arms 60 and the yoke arms 54a. Also carried by the pit finder arms 60 are pit throwout pins 79. As the fruit half is brought into contact with a pitting plate 43 with the pit located in the pitting orifice 44 and the cups 27 continue to advance, the pitting frame 42 is advanced by the means as hereinbefore described with the result that driving gears 57 are rotated through their connection with the pitmans 65. The clutch dogs 70 are at the start of this operation in engagement with the clutch dog recesses 76 with the result that the shaft 62 is rotated, advancing the pit finder 40 and the pitting knife 41 in the position indicated in Figure 7 to the position indicated in Figure 8. The pit finder moves forward until its tip contacts the kernel cavity of the pit and passes therethrough coming to rest in the bottom of the kernel cavity as indicated in Figure 8. This arrests further movement of the pitting knife assembly and regulates the depth of cut which the pitting knife 41 will make in the flesh of the fruit half. At this instant the clutch dogs 70 pass out of the depressions 76 leaving the assembly in the position illustrated in Figure 8. As the gears 57 continue their rotation, they rotate the pitting knife through the idlers 56 and drive pinions 55, causing the pitting knives to travel through approximately 180° of rotation during the continued movement of the pitting head with the pitting cups 27.

During the return movement of the pitting head the rotation of the pitting knives 41 is reversed which throws the assembly, including the pitting knife 41 and the pit finder 40, back into its starting position, returning the clutch dogs 70 to the depressions 76. During this return operation, the loosely mounted throw-out pins 79 engage the fruit pits to knock the same out of the pitting recess 54. It will be apparent that the adjustment pin 78 will provide means for adjusting the depth at which the pitting knives 41 pass around the fruit pit with relation to the pit finders 40.

In case the pit half is not correctly located in the fruit half to permit the pitting knife 41 to pass through the flesh of the fruit around the pit after the pit finder 40 is located in the kernel cavity, means are provided which permit an automatic adjustment of the relationship whereby the knife may pass through the flesh of the fruit around the pit. The normal relationship between the pit finder 40 and the pitting knife 41 is established through the pressure exerted by the springs 64. In case the pit finder is not able to pass into the kernel cavity as indicated in Figure 8 because of a faulty splitting of the pit, or for any other reason, it will be apparent that the pit finder may not find the bottom of the kernel cavity. In this case the pit finder would not pass into the kernel cavity a sufficient distance to permit the pitting knife to pass around the pit with the relationship as established for normal operation. In this case the pitting knife 41 would engage the pit. The pressure as thus established would permit the pit finder to back up with the pit finder arms 60 rotating upon their pivots 61, compressing the spring 64, allowing the knife 41 to pass around the pit as the pit followed the pit finder in the pitting recess 44, thus allowing completion of the pitting operation without damage to the pitting knife 41 or without causing the pit to be broken. The function of the pit finder 40 is to locate the pitting knife 41 in relation to the depth of the pit half in the fruit half. The pit finder does not shift the position of the peach pit but acts to arrest the movement of the pit and fruit half when the pit finder reaches the bottom of the kernel cavity. Thus the pit finder locates the position of the pit half within the radius of operation of the pitting knife by arresting the pit's inward movement so that the pitting knife will closely follow the pit contour.

In order to provide for adjustment of the fruit halves within the cups 27 in such manner as to insure the pitting knife passing closely to the stem end of the pit at the start of the pitting operation, a relationship is maintained between the pitting cups and the pitting head such as will cause the fruit halves to assume a position within the cups irrespective of their size between the limits normally found to position the stem end of the fruit halves in the position where the pitting knife will pass closely around the stem end of the pits.

It will be noted that the pitting cups 27 are in section formed of the front and rear walls 80 and 81 which are substantially at right angles to each other and extend at substantially 45° angles on each side of the angular line indicated at 82 which is 16° off the actuating line of the cup 27. As indicated in Figure 8 the contacting faces of the plates 43 of the pitter head are positioned at an angle with relation to the direction of the travel of the cups 27 as indicated by the line 83 and the face 84 of the pitting cups 27 is parallel with this angle for approximately two-thirds of its extent. The latter approximately one-third portion of the face being cut backward at approximately 10° as indicated at 85 to allow the cup 27 to closely fit the angular incline of the dividing plates 28 which support the peach halves up to the time of their passing onto the pitting plates 43 of the pitting assembly. By the use of this relationship it will be found that as different sizes of peaches, that is, peaches of different diameters, are mounted in the cups 27, that their centers will be shifted in relation to the center line of the cup with the result that the stem end of the fruit halves will follow closely the position required for entrance of the pitting knife into the flesh of the fruit at the stem end of the pit and will position the pit in such manner that the pitting knife will pass freely around the pit.

Means are provided for controlling the operation of the transfer means B, including the holding cups 27, which means may be of the following construction. Mounted on the frame 25 concentric with the shaft 31 are cam rings 86 providing internal cam ways 87 with which cam rollers 88 carried by the cup-operating arms 29 cooperate in controlling the opening and closing operations of the holding cups 27. The cup-holding arms 28 are pivotally secured as indicated at 89 upon the heads 30 at their one end and are pivotally secured as indicated at 90 to the cup shanks 91. Cup-operating arms 29 are formed as bell crank levers and as previously stated, are pivotally secured to the operating heads 30 and are likewise pivotally secured as indicated at 92 to the cup shanks 91 at points spaced from their pivots 90. Springs 93 are interconnected between the operating heads 30 and the cup-holding arms 29 and normally act to urge the cups 27 into gripping or holding position.

The cam ways 87 operated in conjunction with the cam rollers 88 control the opening of the cups 27 to permit the same to pass over and grip the fruit as it is carried upon the impaling members 9.

The means provided for driving the elements of the continuously operating peach pitting machine may be of any suitable or desirable form and are herein illustrated as comprising an electric motor 94 mounted upon the frame 25 operating through a suitable drive connection 95 to drive the cam shaft 49. Mounted upon the cam shaft 49 is a pinion 96 which meshes with a gear 97 secured to the transfer shaft 31. The gear 97 in turn meshes with a gear 98 secured to the conveyer drive shaft 6. The motor shaft to the motor 94 is also connected through a drive means 100 to drive the saw shaft 34.

Having fully described my invention, it is to be understood that I do not wish to be limited to the details herein set forth, but my invention is of the full scope of the appended claims.

I claim:

1. In a fruit pitting machine of the character described, the combination of means for supporting and progressing a halved fruit over a pitting plate having a pitting orifice therein, a pitting means mounted to operate through the orifice, a pit locater adapted for operation in conjunction with the pitting means to locate the pit of the fruit in advance of the operation of the pitting means, and means for advancing the pitting plate, pit locater and pitting means with the fruit as the same progresses and during the pit-locating and pit-removing operations, and means for operating the pit locater and the pitting means during said progression.

2. In a fruit pitting machine of the character described, the combination of a pair of half fruit supporting means adapted to support two halves of a fruit and to progress the same over pitting orifices in pitting plates, and means for progressing the pitting plates with the fruit supporting means during a pitting operation, a pair of pitting members operable through the pitting orifice, pit-locating means operable through the pitting orifice to locate pits in the halved fruit during movement of the pitting plates with the fruit supporting means and prior to actuation of the pitting means, and means for actuating the pitting means subsequent to the location of the fruit pit by the pit-locating means.

3. In a fruit pitting machine, the combination of a pitter head including a pair of spaced pitting plates having pitting orifices therein, pit finder shafts carried by the pitting head, pit finders carried by the finder shaft in position to pass through the pitting orifices, means for actuating the pit finder shaft to thrust the pit finder through the pitting orifices, and yieldable means interposed between the pit finder shaft driving means and the pit finder shaft for arresting the drive of the pit finder shaft when the pit finders have been thrust through the pitting orifices to locate the pits.

4. In a fruit pitting machine, the combination of a pitter head including a pair of spaced pitting plates having pitting orifices therein, pit finder shafts carried by the pitting head, pit finders carried by the finder shaft in position to pass through the pitting orifices, mean for actuating the pit finder shaft to thrust the pit finder through the pitting orifices, yieldable means interposed between the pit finder shaft driving means and the pit finder shaft for arresting the drive of the pit finder shaft when the pit finders have been thrust through the pitting orifices to locate the pits, pitting means operable through the pitting orifices to cut the pits from fruit halves when the pits have been located by the pit finders, and means operably connected with the pit finder drive means for actuating the pitting means after movement of the pit finders have been arrested.

5. In a fruit pitting machine, the combination of means for supporting halved fruit, a pitting head having spaced-apart pitting plates with pitting orifices therein, means for moving the fruit-supporting means in position of registry of the pits with the pitting orifices, means for moving the pitting head with the fruit-supporting means, means carried by the pitter heads for locating the pits in the fruit supported in registry with the said pitting orifices, and means for operating the pitting means to remove the pits from the fruit when the pits have been located by the pit-locating means and during progression of the pitting head with the fruit supporting means.

6. In combination in a fruit pitting machine, of a pitting cup having front and rear walls of approximately 90° relationship defining fruit-half receiving cups, a pitter head having a pitting plate with a pitting orifice therein, and the face of the pitting cup being approximately parallel with the pitting plate and at an angle of approximately 16° with relation to a vertical plane passed through the center of rotation of the pitting means.

7. In combination in a fruit pitting machine, of a pitting cup having front and rear walls of approximately 90° relationship defining fruit-half receiving cups, a pitter head having a pitting plate with a pitting orifice therein, the face of the pitting cup being approximately parallel with the pitting plate and at an angle of approximately 16° with relation to a vertical plane passed through the center of rotation of the pitting means, and the upper surface of the pitting cup being cut away at a point greater than half the extent of the pitting surface at its rear substantially parallel with the line of progression of the pitting cup.

8. In combination in a fruit pitting machine, of a fruit pitting cup means for progressing the fruit cup, the fruit cup having front and rear walls related at approximately 90° and the upper edge of the pitting cup being inclined from the direction of progression of the pitting cup at approximately 16°, rotary pitting means, a pitting plate having a pitting orifice through which the rotary pitting means operates, the pitting plate being positioned substantially parallel with the inclination of the edge of the pitting cup whereby halved fruit of different diameters carried in the pitting cup with their stem end at the rear of the pitting cup will be located in the pitting cup to position the stem end of the pit within the path of movement of the pitting means in severing the fruit pit from the halved fruit.

9. In a fruit pitting machine, the combination of a pitter head having a pitting plate with a pitting orifice therethrough, a pit finder, means for thrusting the pit finder through the pit orifice to locate the fruit pit, a rotary pitting means, means for actuating the rotary pitting means, and means for yieldably holding the pit finder in position to locate the pit whereby the pit finder will be retracted through the pitting orifice on contact of the pitting means with the pit.

10. In a fruit pitting machine, the combination of a pitter head having a pitting plate with a pitting orifice therethrough, a pit finder, means for thrusting the pit finder through the pit orifice to locate the fruit pit, a rotary pitting means, means for actuating the rotary pitting means, means for yieldably holding the pit finder in position to locate the pit whereby the pit finder will be retracted through the pitting orifice on contact of the pitting means with the pit, and a pit ejector carried by the pit finding means.

11. In a fruit pitting machine, the combination of a conveyer, fruit carrying means mounted on the conveyer to receive and position fruit, a fruit halving means, a stationary impaling blade mounted in advance of the fruit halving means, and a cutting disc mounted in the path of the fruit in advance of the stationary impaling blade.

12. In a continuously operating fruit pitting machine, the combination of a conveyer, fruit impaling blades carried by the conveyer upon which fruit is impaled and located from its calyx end with its plane of suture substantially vertical and whereby the flesh of the fruit is severed to the depth of the pit below the pit during the impaling operation, means for severing the fruit into halves, a stationary impaling blade having a cutting edge in the plane of suture to form a preliminary cut in the flesh of the fruit above the pit prior to delivery of the fruit to the fruit halving means, and a cutting disc mounted in the path of the fruit with its cutting edge in the plane of suture of the fruit to form a cut in the fruit preliminary to the fruit passing along the stationary impaling blade.

13. In a continuously operating fruit pitting machine, the combination of means for supporting and progressing a halved fruit, a pitting unit, means for advancing the pitting unit with the fruit during a pitting operation and the pitting unit comprising an apertured pitting plate, a rotary pitting means located to operate through the aperture, a pit locator adapted for operation in conjunction with the pitting means to locate the pit of the fruit within the radius of operation of the pitting means, means for advancing the pitting plate, pit locator and pitting means with the fruit during the pit-locating and pit-removing operations, and means for actuating the pit locator and rotating the pitting means during said progression.

14. In a continuously operating fruit pitting machine, the combination of a pair of fruit carriers each adapted to carry a half fruit, spaced apertured pitting plates adapted to contact the flat surfaces of the fruit halves, means for yieldably urging the fruit holders toward the apertured pitting plates, pitting means mounted within the apertured plates, said pitting means including a pit locator and a rotary pitting knife adapted to be actuated through the aperture of each pitting plate, and means for actuating the pit locators to engage the kernel cavity of the pit to arrest movement of the fruit half toward the pitting plate in accordance with the depth of the fruit pit within the fruit half, means for actuating the pitting knives to pass the same around the pits so located, and means for advancing the pitting plate, pit locator and pitting means with the advance of the fruit holding means.

15. In a fruit pitting machine, the combination of a conveyer, fruit carrying means mounted on the conveyer to receive and position fruit, means for halving the fruit, a stationary impaling blade mounted in the path of the fruit in advance of the halving means, and a cutting disc mounted in the path of the fruit in advance of the stationary blade adapted to cut the flesh of the fruit to form a kerf therein preliminary to the fruit passing along the stationary impaling blade.

16. In a fruit machine of the character described, the combination of a conveyer having spaced apart impaling blades providing fruit locating means adapted to receive and support a fruit with its plane of suture in a substantially vertical plane, means for halving the fruit, a stationary impaling blade for guiding the fruit in its movement toward the halving means, and a rotary cutting means mounted in the plane of suture of the fruit as supported on the conveying means in advance of the guiding blade and operating to form a cut in the flesh of the fruit preliminary to the fruit passing onto the guide blade, and means for transferring the fruit from the conveyer over the guide blade and into position to be halved by the halving means.

17. In a fruit pitting machine, means adapted to receive and support a fruit from its stem end with the plane of suture of the fruit in alignment with the supporting means, means for halving the fruit, means for cutting the flesh of the fruit in advance of the halving means substantially to the pit located in the plane of said supporting means, and a rotary cutting means mounted in advance of the first said cutting means for cutting a kerf in the flesh of the fruit while the fruit is supported on the receiving and supporting means preliminary to the operation of the means for cutting the flesh of the fruit to the pit, and means for transferring the fruit from the receiving and supporting means over the first stated cutting means and into position to be halved by the halving means.

ALBERT R. THOMPSON.